FIG. I.

May 1, 1945.　　　J. B. ARMITAGE　　　2,374,719

MACHINE TOOL TRANSMISSION AND CONTROL MECHANISM

Filed May 24, 1941　　　5 Sheets-Sheet 2

INVENTOR:
JOSEPH B. ARMITAGE
BY: W. D. O'Connor
ATTORNEY.

May 1, 1945.  J. B. ARMITAGE  2,374,719
MACHINE TOOL TRANSMISSION AND CONTROL MECHANISM
Filed May 24, 1941  5 Sheets-Sheet 3

INVENTOR:
JOSEPH B. ARMITAGE
BY: W. D. O'Connor
ATTORNEY.

May 1, 1945.  J. B. ARMITAGE  2,374,719

MACHINE TOOL TRANSMISSION AND CONTROL MECHANISM

Filed May 24, 1941  5 Sheets-Sheet 5

INVENTOR:
JOSEPH B. ARMITAGE
BY: W. D. O'Connor
ATTORNEY.

Patented May 1, 1945

2,374,719

UNITED STATES PATENT OFFICE 2,374,719

MACHINE TOOL TRANSMISSION AND CONTROL MECHANISM

Joseph B. Armitage, Wauwatosa, Wis., assignor to Kearney & Trecker Corporation, West Allis, Wis., a corporation of Wisconsin Application May 24, 1941, Serial No. 394,966

21 Claims. (Cl. 90—22)

This invention relates generally to machine tool power transmission and control mechanism and more particularly to an improved feeding mechanism for milling machines that is especially suitable for use in machines of the type adapted to perform climb cutting operations.

In performing milling operations in accordance with the climb cutting method, the milling cutter is rotated in such direction that its cutting teeth exert forces upon the work being milled in the direction of the feeding movement. As the forces exerted by the successive teeth of the cutter are of intermittent nature, they tend to cause undesirable jerky movement or chattering action between the cutter and the work piece, if any lost motion exists in the driving mechanism. Furthermore, the forces exerted by the cutter tend to cause the work piece to overrun the feeding mechanism and this may result in the cutter being overloaded or riding up on the work thereby breaking the cutter or the work piece, or causing other serious damage.

A general object of the present invention is to provide an improved feeding mechanism for a machine tool;

Another object of the invention is to provide improved means for preventing overrunning of a machine tool feeding mechanism, such as might result from forces exerted by the cutting tool or other external means;

Another object is to provide a feeding mechanism for a machine tool that is arranged for operation at feed rate without overrunning and at rapid traverse rate without excessive resistance;

Another object is to provide a machine tool feed driving mechanism having improved selectively engageable means for opposing the forces tending to cause overrunning of the feeding mechanism;

Another object is to provide a machine tool feeding mechanism having a brake that is selectively engageable to prevent overrunning of the drive mechanism;

Another object is to provide a work feeding mechanism in which a selectively engageable brake is utilized to prevent overrunning, and means are arranged for automatically releasing the brake when the mechanism is adjusted for operation at rapid traverse rate;

Another object is to provide an improved feeding mechanism in which a screw and nut driving arrangement is adapted to be adjusted into close engagement for obviating lost motion and a selectively engageable brake is arranged to operate upon the screw and nut mechanism in manner to prevent overrunning of the feeding mechanism;

Another object is to provide a feeding mechanism including a screw and nut adjusted to prevent lost motion while permitting free relative rotation, and provided with a brake selectively engageable to prevent overrunning during feeding operations, together with means for automatically releasing the brake during rapid traverse operation of the mechanism.

Another object is to provide improved control apparatus for a machine tool feeding mechanism;

Another object is to provide an improved control means for a brake mechanism operative upon the transmission for moving the table of a milling machine, whereby the brake mechanism may be rendered operative during power feed climb cutting to resist the action of the cutter upon the workpiece and rendered inoperative automatically to facilitate movement of the work support either manually or at rapid traverse rate.

Another object is to provide improved braking mechanism for regulating the movement of a machine tool element;

Another object is to provide a machine tool braking mechanism arranged to be fitted with interchangeable actuating mechanism to provide for manually, hydraulically or electrically operating the brake.

According to this invention, a machine tool, for example a milling machine having feeding apparatus such as a screw and nut device, is adapted to perform climb cutting milling operations by providing it with independent means for obviating lost motion in the feeding mechanism and for preventing overrunning of the driving mechanism. The means for obviating lost motion may be in the form of an arrangement for adjusting the nut into snug engagement with the screw, the adjustment being so established that all looseness is removed but free relative rotation between the screw and the nut is permitted. This provides for operation of the mechanism manually or at rapid traverse rate without undue resistance, but subjects the mechanism to the possibility of overrunning the established rate of feed under the influence of forces exerted by reason of the climb cutting action. To prevent overrunning, a selectively engageable friction brake is arranged to operate upon the screw and nut mechanism in manner to provide sufficient resistance to oppose the feed advancing forces exerted by the cutter during a climb cutting operation.

At other times, the brake may be released to permit free operation of the feeding mechanism, and this may be effected by automatic control means arranged to release the brake automatically upon engagement of the rapid traverse driving mechanism or upon disengagement of the feed driving mechanism in conditioning the machine for manual operation.

In the various embodiments of the invention shown in the accompanying drawings, the mechanism for operating upon the table transmission of the milling machine to prevent overrunning, is illustrated in several forms and is shown equipped with manual control means, hydraulic control means, and electrical control means arranged in various combinations.

The foregoing and other objects of the invention, which will become manifest from the following detailed specification setting forth several illustrative embodiments, may be achieved by the particular apparatus depicted in and described in connection with the accompanying drawings, in which.

Figure 7:
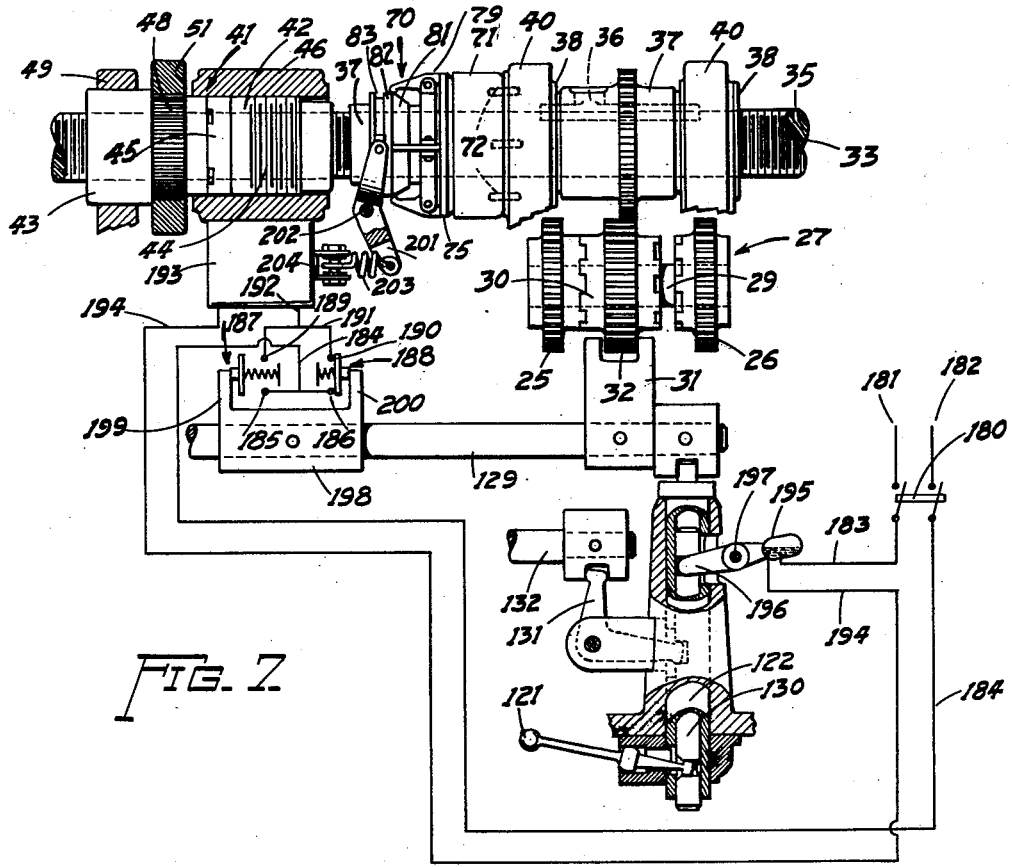
Figure 8:
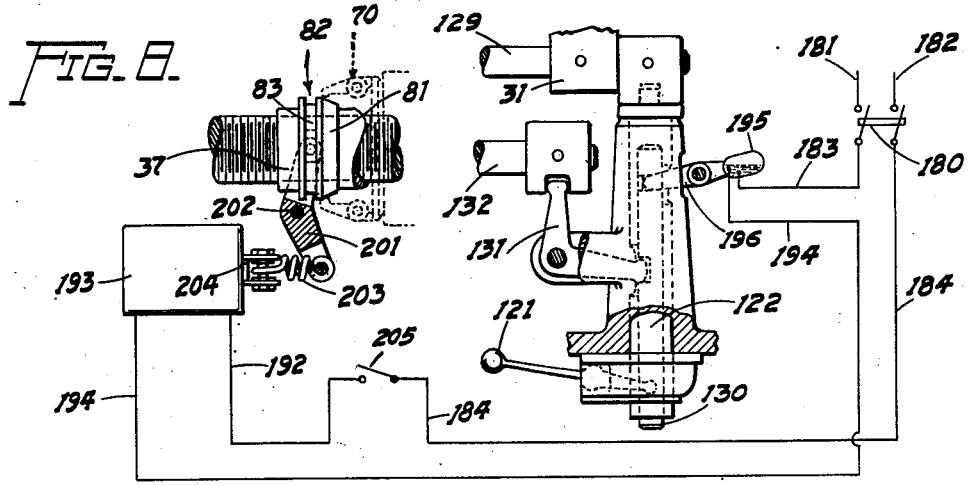

Fig. 7 is another diagrammatic view of a portion of the mechanical transmission for the movable work support including the brake mechanism and showing an electrical control circuit automatically operable in response to the action of the rate change control mechanism for rendering the brake mechanism operative or inoperative; and, Fig. 8 is a similar diagrammatic view showing a modified form of electrical control circuit adapted to control the operation of the brake mechanism under action of the rate change control mechanism.

Figure 1:
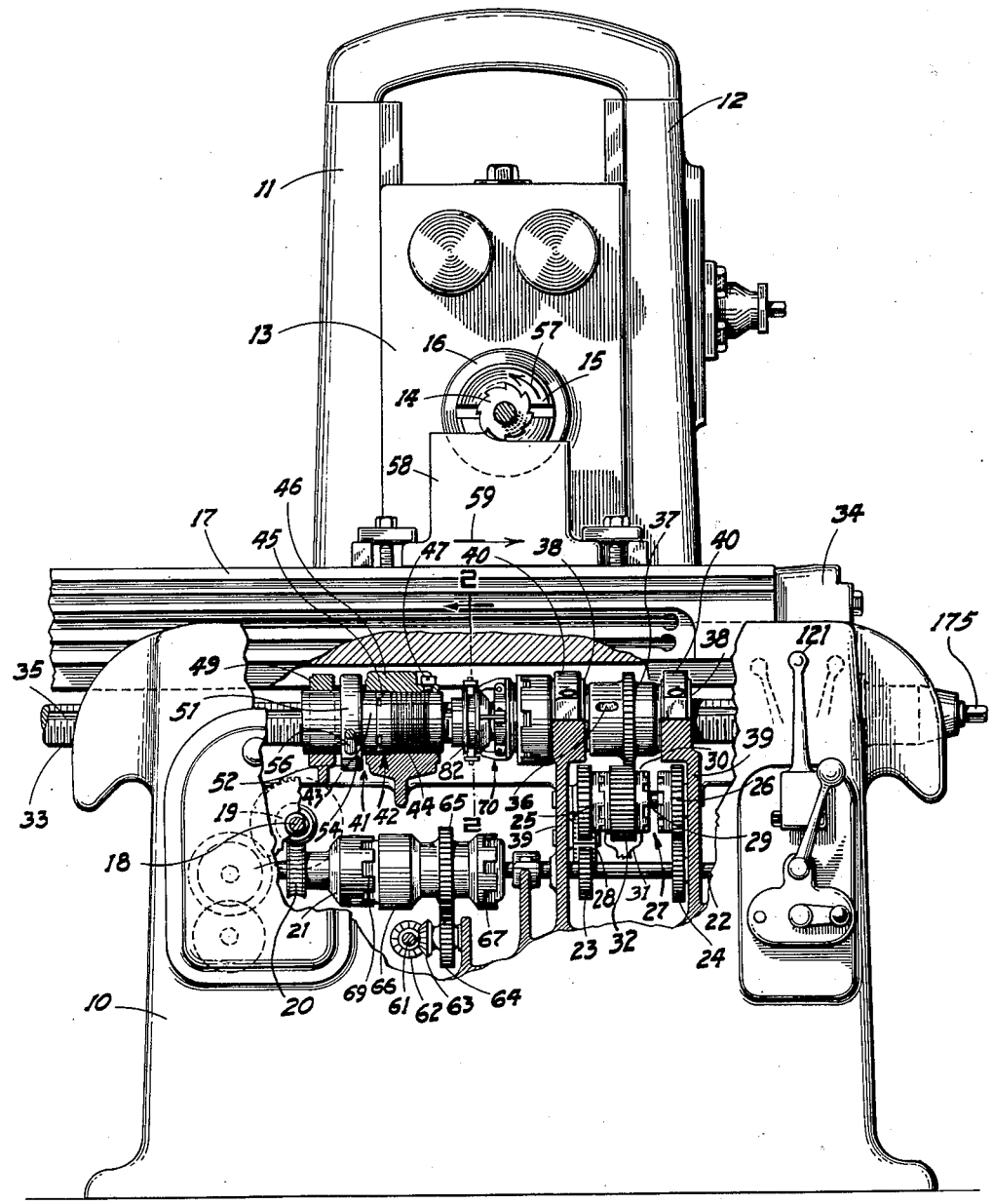
Figure 1 is a front elevational view of a milling machine with parts broken away to disclose the improved table driving transmission mechanism embodying the features of the present invention.

Referring more particularly to the drawings, the machine tool shown as illustrative of apparatus in which a feeding mechanism embodying the present invention may be incorporated advantageously, is a milling machine of the bed type generally similar to the machine more fully shown and described in co-pending patent application Serial No. 262,756 filed March 18, 1939 which issued March 3, 1942 as U. S. Patent No. 2,275,241. Referring specifically to Fig. 1, of the drawings, the milling machine there shown in front elevation comprises essentially a hollow bed or base 10 that constitutes the main frame or foundation of the machine and forms a housing for the driving mechanism and the controlling apparatus. On its upper rear surface, the base 10 supports a pair of rigidly mounted spaced uprights 11 and 12 constituting together an upstanding open column structure in which a spindle block or carrier 13 is slidably mounted for bodily vertical movement. The spindle block 13 supports a cutting tool 14 secured in a tool spindle 15, rotatably mounted in a quill 16, that is in turn axially adjustable in the spindle block. By reason of the adjustable mountings of the quill 16, and the spindle block 13, the cutter 14 may be moved to any desired position in the vertical plane through the axis of the tool spindle 15, within the limits of the machine. The usual adjusting and clamping means are provided for the spindle block 13 and quill 16 to effect their various movements and to lock them in desired position of adjustment.

Power for rotating the spindle 15 to drive the cutting tool 14 carried thereby may be derived from a motor (not shown) ordinarily mounted in the hollow base of the machine and operatively connected, by means of speed changing gearing and direction reversing mechanism, to effect rotation of the spindle in either direction and at a selected speed, in the usual well known manner.

On the upper surface of the bed 10 in front of the column structure, a table or work supporting element 17 is guided for reciprocating horizontal sliding movement along the bed, in a path transverse to the axis of the tool spindle 15, to provide means for moving a workpiece in cooperating relationship with the cutting tool 14.

Power for reciprocating the table 17 is likewise derived from the motor in the base of the machine, and the usual arrangement is provided for adjusting the driving mechanism to cause the table to be moved at a selected one of a plurality of feed rates or at rapid traverse rate in either direction. As shown in Fig. 1 of the drawings, power for driving the table 17 at feed rate is transmitted from the motor to a shaft 18 through the usual pick-off rate change gear mechanism (indicated by dotted lines) for selecting the desired feed rate of movement for the table 17. A worm 19 fixed on the shaft 18 meshes with and drives a worm wheel 20 connected to an overrunning clutch mechanism 21 through which power is transmitted to a driving shaft 22.

The shaft 22 has fixed thereon a pair of gears 23 and 24 that drive gears 25 and 26 of a reverser mechanism 27, the gear 23 acting through an idler gear 28 and the gear 24 acting directly, to effect opposite rotation of the gears 25 and 26 respectively. The reverser mechanism 27 includes a shaft 29 on which the gears 25 and 26 are freely rotatable and that carries a slidably mounted shiftable clutch gear member 30 interposed between the gears 25 and 26. The clutch gear member 30 is provided with clutch teeth at its opposite ends that are adapted selectively to engage complementary clutch teeth formed on the inner faces of the gears 25 and 26 respectively. A shifter fork 31 engages the sides of a gear toothed element 32 formed on the periphery of the clutch member 30 to provide means for moving the clutch teeth into engagement with the gear 25 or the gear 26 to select the direction of rotation of the gear 32.

Movement of the table 17 is effected by means of a table feed screw 33, that is rotatably journalled in end brackets 34 (only one of which is shown) secured to the respective ends of the table. In order that the table screw may be rotated by power, it is provided with a longitudinal spline or keyway 35 adapted to receive a driving key 36 secured in a sleeve gear 37 that is disposed to mesh continuously with and be driven by the toothed element 32 of the slidably mounted clutch gear 30. The sleeve gear 37 is journalled in spaced bearings 38 supported on webs 39 formed integral with the bed 10, the bearings being retained by bearing caps 40 and the gear 37 restrained against endwise movement by contact with the ends of the bearings 38.

Figure 6:
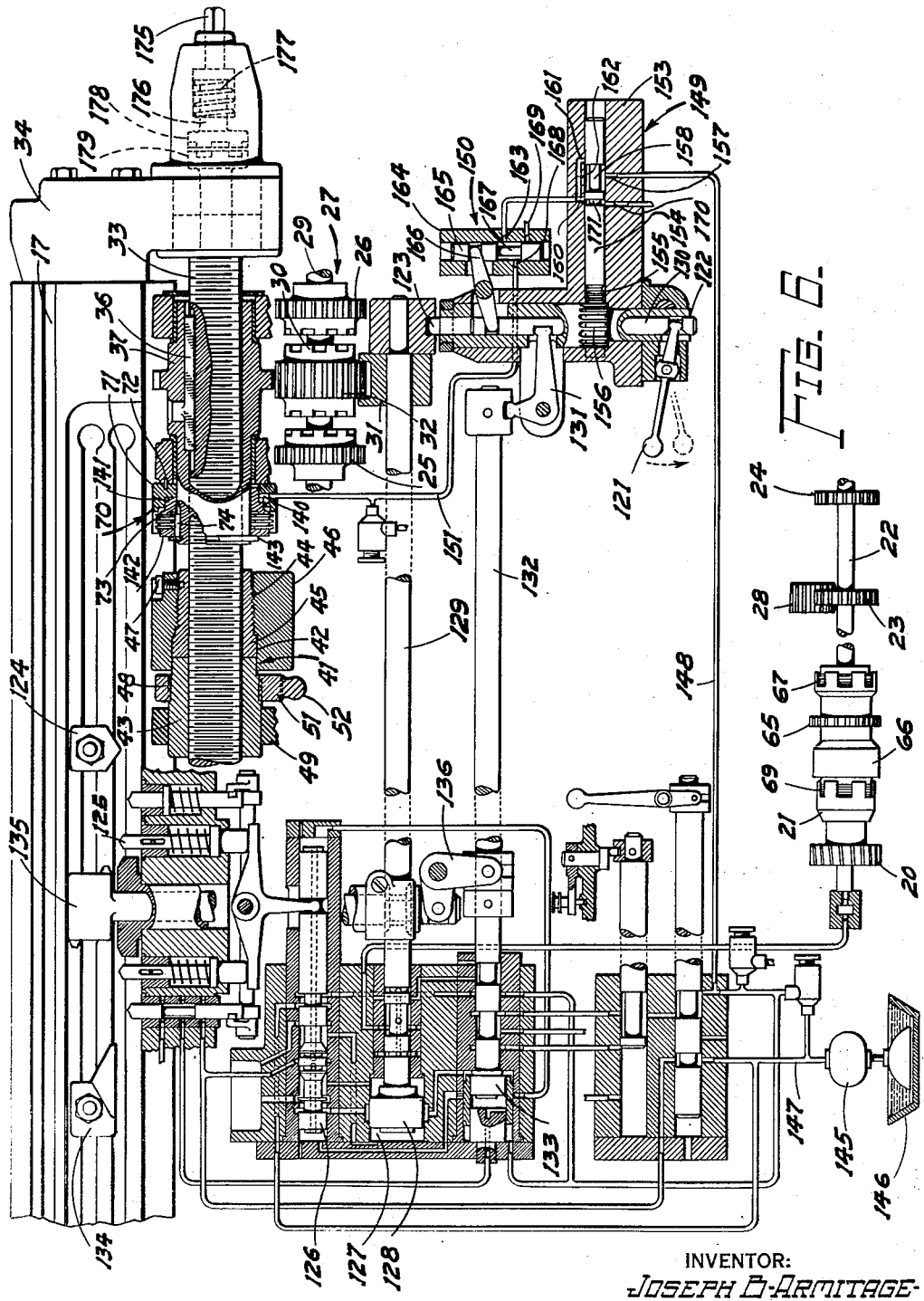
Fig. 6 is a schematic diagram of a hydraulic system for controlling the operation of the movable work support, including automatically operated hydraulic means responsive to the action of the control means for energizing and deenergizing the brake actuating mechanism.

The feed screw 33 is in threaded driving engagement with a complementary anti-backlash nut mechanism 41 shown in section in Fig. 6 and comprising a stationary part 42 fixed in the frame and an adjustable or movable part 43. Although the screw 33 is shown rotatably mounted in the table, it is to be understood that the screw could be fixed in the table and the nut rotatably mounted in the frame or conversely the screw could be rotatably mounted in the frame and the nut fixed in the table. The fixed part 42 of the nut mechanism 41 includes a threaded shank portion 44 and a shouldered end portion 45, the shank portion being threadedly received in a shouldered aperture in a cap covered housing 46 formed integrally with the bed 10. The fixed nut element 42 is screwed into shoulder abutting relationship with the housing 46 and a set screw 47 serves to lock it in fixed position.

Figure 2:
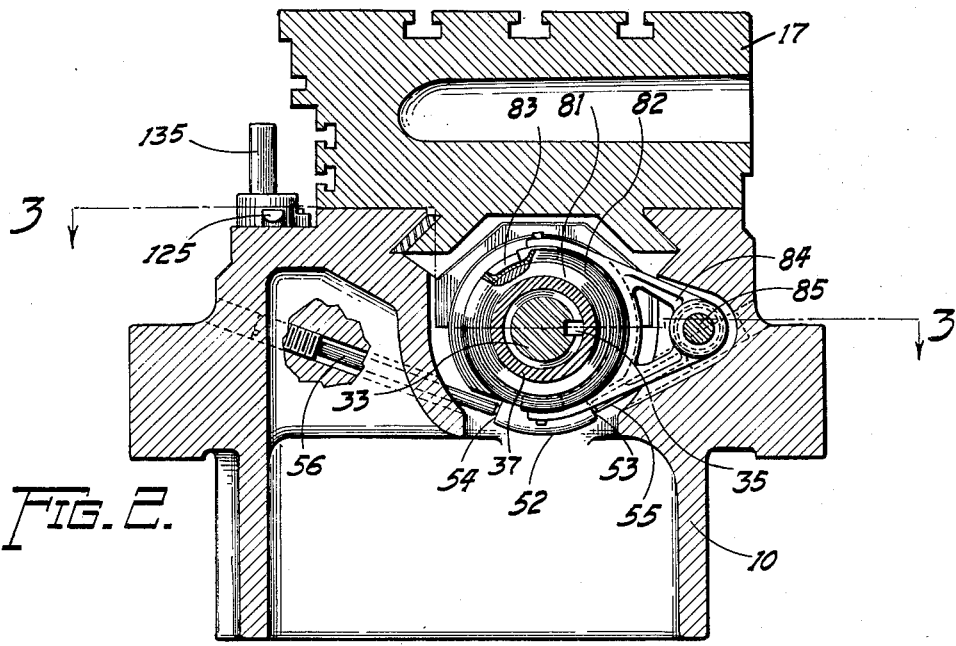
Fig. 2 is a vertical transverse sectional view, taken on the line 2—2 of Fig. 1, showing the table feeding mechanism and means for adjusting it to prevent overrunning.

The adjustable part 43 of the nut mechanism 41 is provided with an externally serrated central portion 48 flanked by cylindrical end portions that are journalled respectively in the housing 46 and a housing 49. An internally serrated ring or collar 51 provided with a lug 52 (Fig. 2) is fitted on the externally serrated portion 48 in desired position of angular adjustment so that the lug 52 extends downwardly when the adjacent ends of the movable and fixed parts 43 and 42 of the nut mechanism 41 are in contact. The lug 52 is provided with a pair of opposed faces 53 and 54 against which adjusting screws 55 and 56, respectively, act to effect rotative adjustment of the movable part 43. This arrangement for adjusting the nut mechanism, by turning one element relative to another is generally similar to that shown and described in co-pending application Serial No. 350,666 filed August 3, 1940, although it is to be understood that any other equally satisfactory adjustable nut device may be utilized.

The adjustment effected between the fixed and movable parts 42 and 43 of the nut mechanism 41 provides means for preventing lost motion between the feed screw 33 and the nut mechanism 41 to enable the machine to be used for climb cutting operations without chatter or jerking. The screws 55 and 56 which are operative respectively upon the faces 53 and 54 of the lug 52, to effect adjustment of the part 43 of the nut mechanism 41, are threadedly received in apertures that extend upwardly and outwardly through the side walls of the bed 10 to provide readily accessible means for effecting the adjustment. To tighten the nut mechanism 41 for eliminating lost motion, the adjusting screw 56 may be turned outwardly to withdraw it from engagement with the face 54 on the movable nut part 43. The screw 55 may then be turned inwardly to cause the movable part 43 to be rotated upon the table screw 33 in such direction that it bears against the fixed part 42 to thereby put the portion of the screw which lies between parts 42 and 43 under sufficient tension to eliminate all lost motion between the threads of the feed screw 33 and the threads of the nut mechanism 41. After proper adjustment has been effected by turning the screw 55, the screw 56 may be turned inwardly to engage the face 54 and lock the adjustable portion of the nut mechanism 41 against movement under the action of the screw 33.

The screw and nut translating mechanism constituted by the feed screw 33 and the adjustable nut 41 is non-irreversible or not completely self-locking, and under ordinary conditions of adjustment the work table 17 is subject to being drawn forward in advance of the feeding rate by action of the cutting tool 14 when operating under climb cutting conditions. For example, with the cutting tool 14 rotating in the direction indicated by arrow 57 in Fig. 1, and a workpiece 58 on the table 17 being fed in the direction indicated by arrow 59, the successive teeth of the cutter will exert forces upon the workpiece which tend to move it in the direction in which it is being fed. These forces may cause the table 17 to be advanced at a rate faster than that established by the feed driving pick-off gear mechanism, thereby drawing the screw 33 through the nut mechanism 41 and causing the screw to turn at increased speed. Since the transmission train includes the overrunning clutch mechanism 21, the screw 33 is permitted to turn at increased speed without interference from the worm and worm wheel mechanism 19 and 20 which continues to operate at the selected feed rate. With the table 17 overrunning the feed driving mechanism in this manner, the workpiece 58 is advanced into the cutter 14 too rapidly, with the result that the cutter is overloaded and may be broken or may climb up on the workpiece thereby causing serious damage to the cutter, the workpiece or the machine structure.

It is possible to avoid overrunning of the table by adjusting the nut 41 sufficiently tight to strongly resist turning of the screw 33 within the nut, thereby preventing movement at a rate faster than that established by the adjustment of the feeding mechanism. However, if the nut is set tight enough to prevent overrunning, a considerable amount of power is required to turn the screw within it, with the result that it becomes difficult to move the table by manual operation of the screw and requires excessive power to actuate it mechanically at rapid traverse rate. Consequently, it is preferable, if conditions will permit, to operate the machine with the nut mechanism 41 adjusted only to such degree of tightness that all end play of the screw within the nut is completely eliminated, the nut not being so tightly set that free rotation of the screw within it is interfered with, thereby permitting easy manual operation and power rapid traverse at high speed.

According to this invention, it is possible to operate under all conditions with the screw and nut mechanism adjusted accurately to close engagement at a degree of tightness only sufficient to prevent lost motion, since overrunning of the screw relative to the nut is prevented by other means, a selectively engageable brake mechanism being arranged to act upon the rotatable element of the screw and nut combination for this purpose. By this arrangement, the restraining means may be applied only during climb cutting operations and may be released whenever it is desired to actuate the table manually or at rapid traverse rate. To this end, means are provided for automatically disengaging the brake when the control mechanism of the machine is set at neutral for manual operation or when it is set to engage the rapid traverse drive.

Again referring to Fig. 1, power for driving the table 17 at rapid traverse rate of movement is transmitted to a shaft 61 from the motor housed in the base of the machine. The usual rapid traverse arrangement is utilized wherein the shaft 61 is constantly driven at rapid traverse rate whenever the motor is in operation to provide a live rapid traverse transmission independent of the feed rate transmission. A bevel gear 62 fixed to the shaft 61 meshes with and drives a mating bevel gear 63 formed integrally with a spur gear 64 that meshes with and drives a spur gear 65 forming part of a rapid traverse friction clutch mechanism 66 generally similar to that more fully described and claimed in Patent No. 2,215,684, dated Sept. 24, 1940. The clutch mechanism 66 includes a plurality of clutch friction discs 67 alternate ones of which are retained against rotation in the element on which the gear 65 is formed and on an element fixed on the shaft 22, respectively.

For engaging the rapid traverse friction clutch discs 67, there is incorporated within the clutch mechanism 66 a hydraulic cylinder and piston mechanism, as shown in the above mentioned patent, that is arranged to operate under either manual or automatic control. When fluid under pressure is admitted to the cylinder, force is exerted against the plates 67 of the clutch to couple the rapid traverse gear 65 to the shaft 22, which can then overrun the feed rate gear 20 by reason of the overrunning clutch 21, to transmit power to the table 17 at rapid traverse rate. When pressure is released from the cylinder, a spring effects release of the operating pressure between the plates 67 of the clutch to release them from the driving engagement that coupled the gear 65 with the shaft 22.

In order to prevent the table 17 from coasting or continuing to move at rapid traverse rate after the clutch 67 has been released, a retarding clutch or brake 69 is incorporated in the rapid traverse clutch mechanism 66 and is operative under action of the rapid traverse clutch disengaging spring to frictionally couple the feed rate drive gear 20 with the shaft 22. This results in quickly reducing the speed of the shaft 22 to that of the feed drive gear 20, whereupon the driving action at feed rate of movement will be resumed promptly through the engagement of overrunning clutch 21.

In accordance with the present invention, the arrangement for preventing overrunning during climb cutting operations includes a brake mechanism 70 that is applied to resist rotation of the table driving transmission, the brake being mounted on and arranged to act directly upon the rotatable element of the screw and nut mechanism. As shown, the brake in this instance controls rotation of the feed screw through engagement with its driving sleeve gear 37 that is splined to the screw, although it could as well be applied to the nut structure if that were the rotatable element of the combination. There is also provided control means for energizing and de-energizing brake actuating mechanism, that is arranged to be operated either manually or automatically in response to changes in adjustment of the table driving mechanism, whereby the brake is rendered operative when the table is in feed rate of movement, and rendered inoperative when the table transmission is either in rapid traverse rate of movement or in a neutral position.

Figure 3:
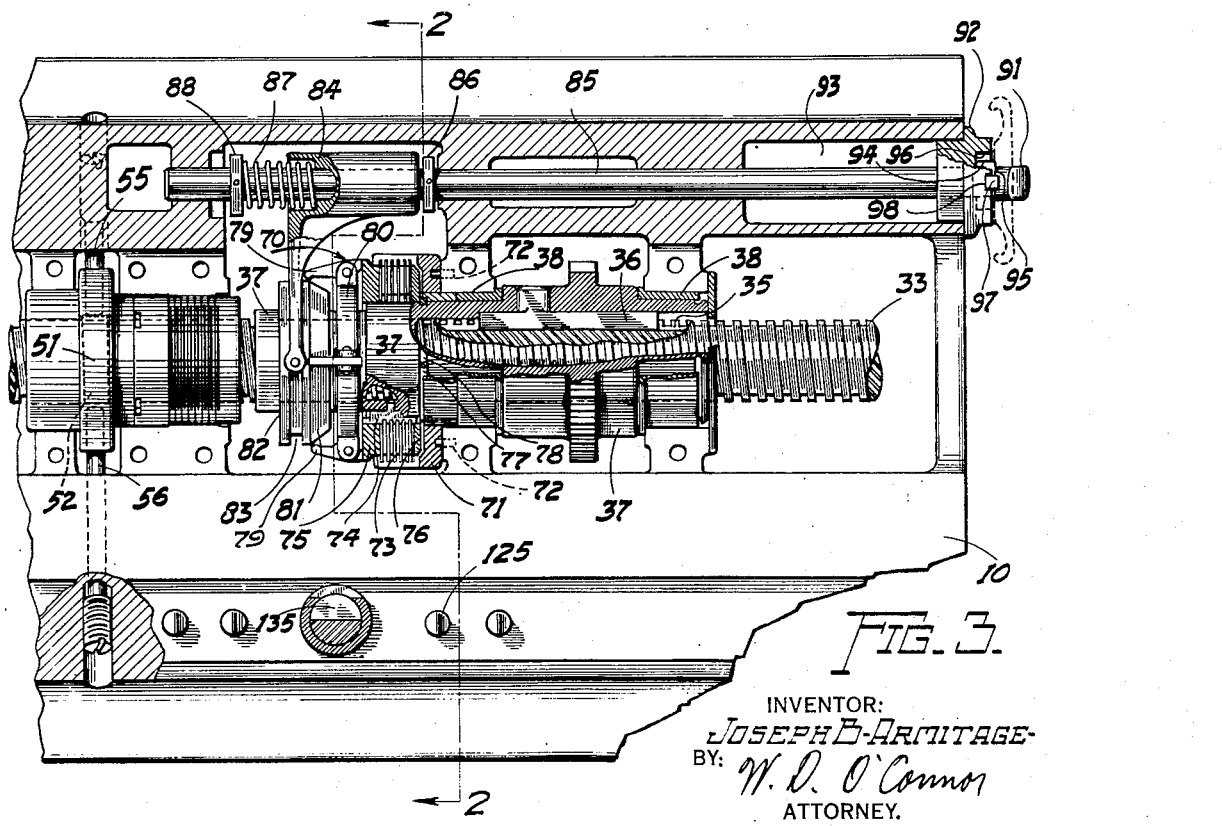
Fig. 3 is a horizontal sectional view, taken on the line 3—3 of Fig. 2 with parts broken away to show the structure of the table feeding transmission mechanism together with manually operable means for actuating a restraining brake arranged to prevent overrunning.

As shown in Fig. 3, the brake mechanism 70 comprises a stationary abutment member 71 that surrounds one end of the screw driving sleeve of the gear 37 and is secured to the portion of the bed 10 that supports one of the bearings 38, by means of anchor pins 72 that serve to prevent rotation of the abutment member relative to the nut mechanism 41. A plurality of friction discs 73 fitted over one end of the sleeve portion of the gear 37 are slidably arranged for mutual frictional engagement, alternate discs being respectively retained against rotation by engagement with the fixed abutment 71 and secured for rotation with the sleeve 37 by a key 74. An abutment ring 75, slidably fitted over the end of the sleeve 37, may be shifted to force the friction discs 73 together and against an abutment ring 76, that is retained against axial movement by a snap ring 77 applied to a groove 78 in the sleeve portion of the gear 37, thereby effecting braking or retarding action on the screw driving sleeve gear 37.

A plurality of brake operating fingers 79 are pivotally mounted in spaced relationship on a ring element 80 that is adjustably threaded on a screw threaded portion of the sleeve 37. One end of each finger 79 is disposed to contact the outer face of the abutment ring 75 and the other end is disposed in the path of movement of a conical surface 81 formed on a spool 82 slidably mounted on the sleeve 37 and having a peripheral groove 83. The groove 83 is adapted to receive pins carried by the ends of a bifurcated shifter fork 84 that is provided with a hub portion mounted for limited axial movement on a shaft 85 that is slidably journalled in the bed 10 adjacent to and parallel with the table feed screw 33. A collar 86 pinned to the shaft 85 serves as an abutment against which the hub of the fork 84 is normally urged by a coil spring 87 that surrounds the shaft 85 and is confined between the hub of the fork 84 and a collar 88 also pinned to the shaft 85. The position of the collar 88 is such that the spring 87 is under compression so as to resiliently urge the shifter fork 84 toward the collar 86 at all times.

The brake mechanism 70 is engaged by effecting a sliding movement of the shaft 85 either manually or automatically in direction to cause the shifter fork 84 to urge the conical surface 81 of the spool 82 into contact with the spool engaging ends of the fingers 79. This causes the fingers to rock on their pivotal mountings and effect inward movement of the abutment ring 75 to urge the discs 73 into frictional face contact for effecting the braking action on the table feed screw 33. The coil spring 87 serves as a yieldable means to urge the shifter fork 84 toward the fixed collar 86 and in so doing it also yieldably retains the spool 82 in a position adjacent to the spool engaging ends of the brake actuating fingers 79. The coil spring 87 also serves to provide a yieldable means for permitting the shaft 85 to be moved a greater distance than is necessary to effect the operation of the brake mechanism 70 and thereby provides a yieldable pressure on the spool 82 to maintain braking pressure between the discs 73 after the shaft 85 has been shifted into brake actuating position.

The manually actuated mechanical linkage means for controlling the operation of the brake mechanism 70 comprises a handle element 91 (see Fig. 3) pinned to the shaft 85 that extends through a flanged sleeve 92 secured to the wall of the bed 10 and forming a guide for the shaft 85 and a closure for a recess 93 in the bed through which the shaft 85 extends. The sleeve 92 is provided with an outwardly extending boss containing an axial bore 94 of sufficient size to slidably receive a hub portion 95 of the handle 91. A pair of diametrically opposite axial grooves 96 formed in the bore 94 serve to slidably receive ears 97 formed on the hub portion of the handle 91 when the handle is rotated to align the ears with the grooves. A shallow kerf 98 disposed at right angles to the grooves 96 is cut in the face of the boss to such depth as to preclude accidental displacement of the handle 91 when the ears 97 lodge in the kerf.

To disengage the brake from the engaged position shown in Fig. 3, the handle 91 may be unlocked by pulling it outward slightly, against the action of the spring 87 until the ears 97 have been withdrawn from the kerf 98, the collar 86 on the shaft 85 serving to limit the outward movement by contacting the supporting web in the bed 10. After the ears 97 are free from contact with the kerf 98, the handle may be rotated in either direction through an angle of ninety degrees or to a position in which the ears 97 are brought into alignment with the grooves 96 formed in the sleeve 92. When the ears 97 are aligned with the grooves 96, the handle may be pushed inwardly to effect the disengaging movement of the spool 82 from contact with the brake actuating fingers 79 under action of the shifting fork 84. Inward movement of the shaft may be limited by the abutment of the collar 88 with the shaft supporting web or by contact of the ears 97 with the inner ends of the grooves 96. To effect re-engagement of the brake, the handle 91 may be grasped and drawn outwardly to a position where the ears 97 are free from engagement with the grooves 96 at which time the handle 91 may be rotated to a position in which the ears 97 are aligned with the kerf 98 to provide means for releasably retaining the shaft 85 against accidental disengagement of the brake. As previously mentioned, the coil spring 87 provides means for yieldably retaining the spool shifting fork 84 in brake engaging position and also provides yieldable means permitting the shaft 85 to be moved a greater distance than is required to effect engagement of the brake mechanism 70, thereby allowing for latching and unlatching movement of the handle 91.

By this arrangement, the brake 70 may be engaged whenever the machine is to perform a climb cutting operation and may be disengaged readily at other times to condition the machine for manual operation or for operation at rapid traverse rate, it being preferable to disengage the brake during conventional milling also, to reduce the amount of power required to drive the table.

Figure 4:
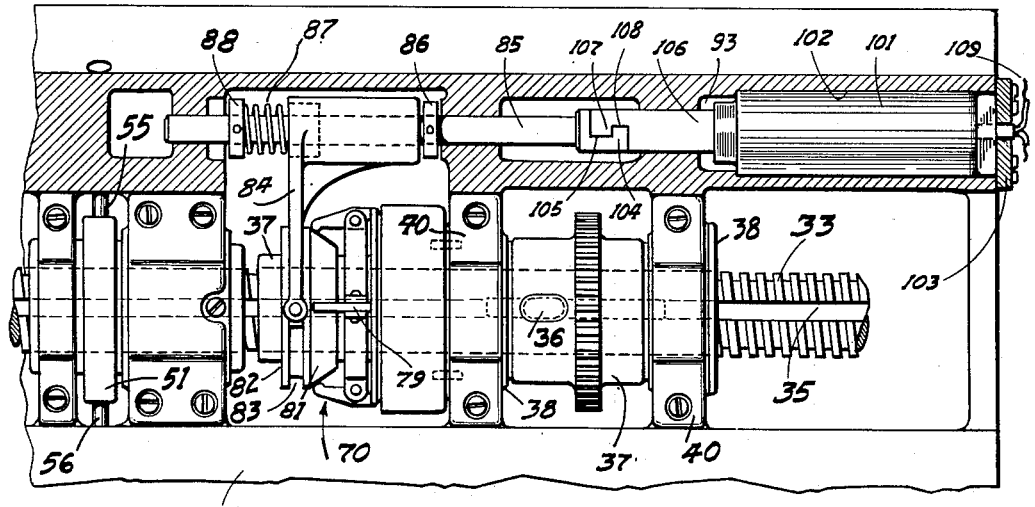
Fig. 4 is a view similar to Fig. 3, but showing electrical means in the form of a solenoid for actuating the brake mechanism.

An electrically operated means for effecting movement of the shaft 85 to shift the brake mechanism 70 into operative or inoperative position is shown in Fig. 4 as an alternative to the manually actuated means. The mechanism there shown comprises a solenoid 101 receivable in a counterbore 102 aligned with the shaft 85 in the recess 93 and retained therein by a cover plate 103. The end of the shaft 85 disposed toward the inner end of the solenoid 101 is in this instance provided with a cut-away portion including a transversely disposed tongue 104 and groove 105. A core element 106 that is slidably mounted in the solenoid 101 and disposed in alignment with the shaft 85 in a bore formed in a web of the base 10, is provided on its inner end with a cut-away portion including a transversely disposed tongue 107 and groove 108. The tongue and groove elements on the shaft 85 and core 106 are complementary and provide a tension or compression transmitting joint between the shaft and core, the two pieces being joined by sliding them laterally into axial alignment with their respective tongues 104 and 107 disposed in their respective grooves 108 and 105.

The remaining parts of the brake operating mechanism are identical with those previously described, and the brake is applied in this instance by passing an electric current through the solenoid 101 to draw the core 106 into the solenoid and thereby effect movement of the shifter fork 84 to the right, as shown in the drawing. When the current supply to the solenoid 101 is cut off, the release of the compression force on the coil spring 87 together with the action of the fingers 79 on the conical surface 81 of the spool 82 will cause the shaft 85 to be retracted to the left to disengage the brake mechanism 70. The means for controlling the flow of current to the solenoid is connected to the electrical leads 109 and may be either a manually operated switch or automatically actuated switch mechanism such as that shown in Figs. 7 and 8 and arranged to disengage the brake automatically when the rapid traverse drive is engaged.

Figure 5:
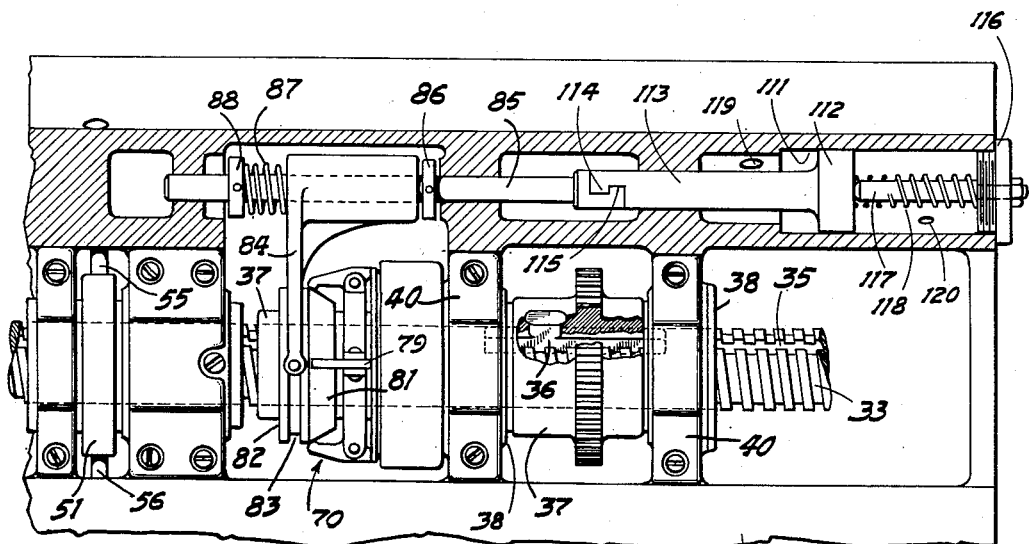
Fig. 5 is another view similar to Fig. 3, showing hydraulic means in the form of a piston and cylinder for actuating the brake mechanism.

An interchangeable hydraulic means for effecting movement of the shaft 85 to shift the brake mechanism 70 into and out of operating position is shown in Fig. 5. The mechanism there shown comprises a cylinder 111, formed in the recess 93 of the bed 10 in alignment with the shaft 85, and containing a piston 112 having a piston rod 113 guided for movement in a bore formed in the bed 10. The end of the piston rod 113 is provided with tongue and groove means 114 and 115 respectively, to match the tongue and groove means 104 and 105 formed on the end of the shaft 85 with which they interlock in the manner previously described. A cover plate 116 serves as a closure for the outer end of the cylinder 111 and supports an inwardly projecting stop pin 117 adapted to contact the piston to limit the movement thereof in one direction. A coil spring 118 supported on the pin 117 and confined between the piston 112 and the cover plate 116 serves as a means for normally urging the piston 112 and rod 85 toward the left, with reference to Fig. 5, to assist in the disengagement of the brake mechanism 70. The collar 88 pinned on the shaft 85 abuts a supporting web for the shaft 85 to limit the movement of the shaft in effecting disengagement of the brake.

A port 119 formed in the cylinder 111 to the left of the piston 112 (as shown in Fig. 5) provides means for admitting fluid under pressure to move the piston 112 in the cylinder 111 for producing brake engaging movement of the shaft 85. Suitable valve means, which may be operated either manually or automatically, are connected to the inlet port 119 for selectively directing fluid under pressure from a fluid pressure source to the cylinder 111 to effect application of the brake 70, or to exhaust fluid from the cylinder through a suitable atmospheric outlet under action of the coil spring 118, control mechanism for this purpose being more fully set forth hereinafter in connection with Fig. 6. A port 120 formed in the cylinder 111 to the right of the piston 112 is open to the atmosphere and serves as a drain to free the inactive portion of the cylinder of any accumulation of oil that may leak past the piston.

In order that any one of the manually actuated, electrically actuated or hydraulically actuated operating mechanisms for the brake mechanism 70 may be substituted conveniently for any other, the operating mechanisms are arranged to be interchangeable, as may be seen by referring to Figs. 3, 4 and 5. In the systems there shown, the brake mechanisms 70 are identical and each may be adapted to cooperate with any one of the three actuating arrangements without the necessity of materially altering the structure of the machine.

A preferred arrangement for effecting automatic release and application of the brake 70 in accordance with the adjustment of control mechanism for regulating the rate and direction of movement of the milling machine table, is shown in Fig. 6 in connection with the complete hydraulic system of the machine. The control mechanism there shown is arranged to effect engagement of the brake 70 whenever the table controlling mechanism is adjusted to cause movement of the table in either direction at feed rate. Conversely, whenever the control mechanism is adjusted to effect movement of the table at rapid traverse rate or is set at neutral for manual operation of the table, the brake is automatically disengaged.

The transmission and control mechanism shown diagrammatically in Fig. 6 is generally similar to that more fully described and claimed in the previously mentioned U. S. Patent No. 2,275,241. As previously described with reference to Fig. 1, power for actuating the table in either direction at either feed rate or rapid traverse rate is transmitted from the rate selecting mechanism in the base 10 to the reversing clutch gear 30 which may be shifted by the shifting fork 31 into clutching engagement with either the forward driving gear 26 or the reverse driving gear 25. Manual selection of the rate and direction of table power movement may be effected by actuating a rate and direction selecting lever 121 which is pivotally mounted at the front of the machine bed 10 for movement in two planes, sidewise swinging movement and movement toward and from the machine.

The direction movement of movement of the table is controlled by the sidewise swinging of the lever 121, the table moving in the direction corresponding to the direction in which the lever is pivoted from its central neutral position, as indicated in Fig. 1. As shown in Fig. 6, the lever is carried on the outer end of a rotatable sleeve 122 that is provided at its inner end with an eccentrically disposed pin 123 which engages a cooperating groove in the shifting fork 31, the arrangement being such that when the lever 121 is moved from side to side, the clutch gear 30 is moved in like manner to engage one or the other of the gears 25 or 26.

Automatic shifting of the reversing clutch gear 30 in response to movement of the table 17, is effected by means of reversing trip dogs such as the dog 124, which cooperate with reversing trip plungers 125 operatively connected to actuate a reversing valve 126. As more fully described in the previously mentioned patent, the reversing valve 126 controls the flow of hydraulic pressure fluid into a reversing cylinder 127 having a cooperating piston 128 that is fixed on the end of a horizontally disposed actuating rod 129 connected to the shifting fork 31 in manner to provide for power shifting of the clutch gear 30.

Manual control of the rate of movement of the table is effected by moving the lever 121 toward or from the machine, the lever being moved toward the machine to effect movement at feed rate and away from the machine to effect rapid traverse movement. As shown, the inner end of the lever engages a control rod 130 that is slidably mounted within the sleeve 122. The rod 130 is in turn engaged by one arm of a bell crank 131 the other arm of which engages a horizontal valve actuating rod 132 connected to a rate controlling valve 133. The valve 133 is operative in manner more fully explained in the previously mentioned patent, to control the flow of fluid pressure to the hydraulic cylinder and piston mechanism that is incorporated in and that operates the rapid traverse clutch mechanism 66. Automatic operation of the rate controlling valve 133 may be effected by the engagement of a rate changing trip dog 134 on the table 17 with a vertically movable trip post 135 in manner to raise or lower it, the post 135 being operatively connected, by means of a bell crank 136, to move the valve actuating rod 132.

The brake mechanism 70 shown in Fig. 6 is generally similar in structure to the mechanism described in connection with Fig. 3. In this instance the brake is arranged to be actuated hydraulically by means of a self contained cylinder and piston mechanism constituting a modification of the hydraulic actuating mechanism shown in Fig. 5. As in the previously described structure, the stationary discs 73 engage the fixed abutment 71, while the movable discs are rotatably connected to the sleeve 37 by the key 74. In this construction, the fixed abutment 71 is bored to constitute a hydraulic cylinder 140 within which a cooperating annular piston member 141, that is slidably mounted on the sleeve 37, is arranged to operate. An abutment collar 142 is fitted on the end of the sleeve gear 37 in opposition to the piston 141 and serves as a retaining element for the friction discs 73, the collar being held on the end of the sleeve by means of a snap ring 143. When pressure fluid is admitted to the cylinder 140, the piston 141 is moved to the left, as seen in Fig. 6, and compresses the friction discs 73 against the abutment collar 142, thereby effecting the braking action.

Fluid under pressure for actuating the hydraulic control system and for engaging the brake 70 is derived from a gear pump 145 which draws lubricating oil from a sump 146 and forces it through a conduit system 147 connected with the various control valves, in the manner explained in the previously mentioned patent. Pressure fluid for actuating the brake 70 flows from the conduit system 147 through a conduit 148 to a valve 149 associated with the direction controlling mechanism and thence to a valve 150 associated with the rate controlling mechanism, the two valves being arranged in series circuit relationship. From the valve 150, a conduit 151 leads to the brake actuating cylinder 140, the arrangement being such that the brake is applied only when both the valve 149 and the valve 150 are open.

The direction responsive valve 149 includes a casing 153 within which a valve plunger 154 is arranged to operate, the plunger being provided with rack teeth 155 disposed to mesh with a pinion 156 formed on the rotatable sleeve 122. Pressure fluid from the conduit 148 flows through a port 157 in the casing 153 that communicates at all times with a cannelure 158 in the valve plunger 154. The cannelure 158 is arranged to be moved in accordance with movement of the control lever 121 into communication with one or the other of a pair of valve ports 160 and 161 formed in the casing 153, the arrangement being such that when the control lever is in neutral position, both the port 160 and the port 161 are out of communication with the cannelure and the inlet port 157.

When the control lever 121 is shifted to either its forward or reverse operating position, the cannelure 158 is moved into communication with one or the other of the ports 160 and 161 both of which connect with a conduit 162 leading to the rate responsive valve 150.

As shown, the conduit 162 connects with a port 163 in a casing 164 constituting the body of the valve 150. Within the casing 164 there is slidably mounted a valve plunger 165 which is connected to operate in synchronism with movement of the control rod 130. For this purpose, the rod 130 and the valve plunger 165 engage opposite ends of a pivotally mounted lever 166.

As appears in the drawings, when the control lever 121 is moved toward the machine to the feed position, the valve plunger 165 likewise is moved inwardly thereby positioning a cannelure 167 on the plunger 165 in communication with the port 163. Pressure fluid admitted through the valve 149 may then flow into a port 168, which is in communication at all times with the cannelure 167, and is connected to the conduit 151 leading to the brake actuating cylinder 140. Accordingly, when the control lever 121 is moved inward to feed position and is moved sidewise to either the forward or reverse position, both the valve 149 and the valve 150 are open, thereby permitting the flow of pressure fluid from the supply conduit 148 through the valves and the conduit 151 to the brake actuating cylinder 140.

When the control lever 121 is moved in one plane outward to rapid traverse position, the valve plunger 165 is likewise moved outward, thereby moving the cannelure 167 out of communication with the inlet port 163 and into communication with an exhaust port 169 through which the pressure fluid may escape from the brake cylinder 140, thereby releasing the brake. Likewise, if the lever 121 is moved in the other plane sidewise to its central or neutral position, regardless of whether it is in the feed or the rapid traverse position, the valve plunger 154 is moved to the position shown in Fig. 6 in which the cannelure 158 is out of communication with both the port 160 and the port 161, the port 160 then being placed in communication with an exhaust port 170 by means of an auxiliary groove 171 in the plunger.

Accordingly, whenever the lever 121 is in neutral position, the brake 70 is released to condition the mechanism for manual operation of the table without resistance from the brake. Movement of the table manually may be effected by applying a crank or the like to the squared end 175 of a stub shaft 176 that may be moved inwardly against the resistance of a spring 177 to engage a clutch element 178 on its inner end with a cooperating clutch element 179 on the end of the table screw 33, the table screw being free to turn by reason of the fact that the brake 70 is disengaged and the adjustable nut mechanism 41 is not so tightly set as to resist turning of the screw. Similarly, when the control lever 121 is moved outward to rapid traverse position, the valve 150 is closed, thereby disengaging the brake 70 and permitting the screw 33 to be turned at rapid traverse rate without undue resistance.

An electrical control system for the brake mechanism 70 is shown as a modification in Fig. 7 in conjunction with the machine control apparatus including the lever 121 that may be moved either manually or automatically, as previously described. A manually operable main switch 180 serves, when closed, to supply current from supply lines 181 and 182 to conductors 183 and 184 of an electrical control circuit for the brake 70. The conductor 184 leads to and connects with contacts 185 and 186, respectively, of normally open direction responsive switches 187 and 188. The other contacts 189 and 190, respectively, of the switches 187 and 188 are both connected to a conductor 191 leading to a conductor 192 that is connected to one end of the coil of a solenoid 193 for actuating the brake. The other end of the coil of the solenoid 193 is connected by a conductor 194 to one contact of a rate responsive mercury switch 195, the other contact of which is connected to the conductor 183 leading back to the switch 180.

The mercury switch 195 is indicated diagrammatically as secured to one end of a lever 196 that is similar to the lever 166 shown in Fig. 6 and is pivotally mounted on a fulcrum pin 197. The other end of the lever 196 is operatively associated with the movable rate control rod 130 so that either manual or automatic movement of the control lever 121 toward or from the machine to select the rate of table travel effects sufficient rocking movement of the mercury switch 195 to operate it. The rocking movement of the switch 195 operates to establish an electrical connection between the conductors 183 and 194 when the control lever 121 is in feed rate position, as shown in Fig. 7, and to break the electrical connection between the conductors 183 and 194 whenever the lever is moved to rapid traverse rate position.

The normally open switches 187 and 188 are also actuated by either manual or automatic movement of the control lever 121, being responsive to its swinging movement in selecting the direction of table movement. The switches 187 and 188 are in opposed relationship and are disposed adjacent to the movable rod 129 on which the clutch actuating fork 31 is fixed so that a collar 198, also fixed on the fork actuating rod 129 and having spaced abutment fingers 199 and 200 formed integrally therewith, will be in position to contact alternatively the movable members of the switches 187 and 188. The abutment fingers 199 and 200 effect closing of the one or the other switch upon movement of the control lever 121 to the right or to the left from its neutral position in effecting movement of the fork 31 to shift the clutch 30 into engagement with the one or the other of the gears 25 or 26 for selecting the direction of table movement. When the lever 121 is in neutral position, both switches 187 and 188 remain in their normally open positions.

With the main switch 180 closed, it will be noted that the electrical circuit for the supply of current to energize the brake operating solenoid 193 can only be completed when both the mercury switch 195 and one or the other of the normally open switches 187 and 188 are closed.

When the control lever 121 is moved to feed rate position and to one of its direction selecting positions, as shown in Fig. 7, the mercury switch 195 and the normally open switch 188 are both closed to permit electrical current to flow through the solenoid 193 to energize it for effecting engagement of the brake mechanism 70.

The brake actuating mechanism here shown constitutes a modification of the electrically actuated brake shown in Fig. 4, either arrangement being responsive to the control system. In this instance, the brake mechanism 70 is actuated through the movement of a lever 201 that is fulcrumed on a pin 202 and has one end operatively associated with the groove 83 of the brake spool 82, the other end being connected by means of a coil spring 203 with the outer end of a core element 204 of the solenoid 193. When the solenoid 193 is energized, the core 204 is drawn into the solenoid to effect rocking movement of the lever 201 to move the spool 82 into brake engaging position in the manner previously described. The spring 203 provides means for yieldably retaining the spool 82 in brake engaging position and for permitting the core 204 to move a greater distance than is required to effect frictional contact between the brake discs 73. The brake mechanism 70 will be retained in brake engaging position as long as the solenoid remains energized. However, movement of the control lever 121 to either the rapid traverse rate position or to the central neutral position will cause either the mercury switch 195 or both the switches 187 or 188 to move to open position, thereby breaking the circuit through the solenoid 193 and permitting the brake mechanism to resume its normal inactive position.

Another somewhat modified form of electrical control for the brake mechanism 70 is shown in Fig. 8, wherein the automatic control of the electrical circuit for energizing the solenoid 193 in response to movement of the control lever 121 to select a direction of table movement at feed rate, is replaced by a manually operable switch 205. The purpose of this modification is to provide means whereby the brake mechanism 70 may be rendered operative while the drive mechanism is in neutral, for the purpose of holding the table securely to permit drilling or some similar operation upon a stationary work piece. With the table transmission in neutral position, the lever 121 being in feed rate neutral position, the mercury switch 195 is in closed position and the electrical control circuit to energize the solenoid 193 then may be completed by manually closing the switch 205.

The control circuit shown in Fig. 8 is generally similar to the circuit shown in Fig. 7 in that it includes the main switch 180, the supply lines 181 and 182, the conductors 183 and 184, the mercury switch 195, the conductor 194, the solenoid 193 and the conductor 192. The principal difference between the two circuits is that in the circuit shown in Fig. 8, the manually operable switch 205 is arranged to effect the connection between the conductors 184 and 192 in place of the pair of automatically operated directionally responsive switches 187 and 188 that are connected between these conductors in the circuit shown in Fig. 7.

In the control circuit shown in Fig. 8, after the main switch 180 is closed, the electrical circuit for energizing the brake operating solenoid 193 may be completed by manually closing the switch 205, but only during those periods in which the mercury switch 195 also is closed. As previously indicated, the mercury switch 195 is closed whenever the control lever 121 is moved to feed rate position, regardless of whether the lever is in neutral position or in one of the direction selecting positions. Consequently, the brake may be engaged to resist climb cutting forces when the table is moving in either direction, or it may be engaged when the feed drive mechanism is in neutral, to lock the table securely against movement at any desired position. As previously explained, when the lever is moved from feed to rapid traverse position, the mercury switch 195 is opened, thereby de-energizing the brake engaging solenoid 193, to release the drive mechanism for operation at rapid traverse rate. Likewise, when the machine is operating at feed rate in either direction and the braking resistance is not required, the brake may be released by manually operating the switch 205, as may be desirable during conventional milling operations.

It will be apparent that a switch or switches similar to the manually actuated switch 205 shown in Fig. 8, may be incorporated in the control circuit shown in Fig. 7 in addition to the directionally responsive switches 187 and 188. For instance, a switch of this nature may be connected in the circuit in parallel relationship with the switches 187 and 188 to provide for locking the table. This renders the circuit capable of maintaining the brake in engaged position whenever the control lever 121 is in feed position, even though the lever may at the time be in the neutral position, thereby providing for selectively locking the table against movement for boring operations. By connecting a similar manually operable switch in series circuit relationship with the directional switches 187 and 188, the circuit is rendered capable of selectively releasing the brake even though the lever 121 is in position to effect feeding movement of the table, thereby adapting the machine to be operated in conventional milling with the brake released to obviate resistance from the brake mechanism. Furthermore, it is to be understood that the hydraulic control arrangement shown in Fig. 6 could in similar manner, be provided with manually actuated control valves for similarly selecting the mode of operation of the transmission mechanism. In this connection, it is evident also, that the manually actuated brake engaging apparatus shown particularly in Fig. 3, could be provided readily with mechanical interlocks arranged to release the brake automatically when the control mechanism is adjusted to effect movement at rapid traverse rate.

From the foregoing detailed description of the construction and operation of the several illustrative embodiments of the invention, it will be apparent that there has been provided an improved transmission and control mechanism for a machine tool work feeding apparatus, that is capable of adapting the machine selectively for performing milling operations either by the conventional method or in accordance with the climb cutting method, and of adapting it for operation at rapid traverse rate or manually. Furthermore, there has been provided control means capable of adapting the transmission mechanism automatically to its various modes of operation in response to adjustment of the machine controlling mechanism, the controlling means being either hydraulically or electrically actuated.

While the invention has been shown and described as applied to the work table feeding mechanism of a milling machine, it is to be understood that it may be incorporated in similar or somewhat modified form in the transmission mechanism for any movable member of any machine tool.

Although several exemplary embodiments of the invention have been shown and described in considerable detail for the purpose of fully disclosing the manner in which the invention may be practiced, it will be apparent to those skilled in the art to which this invention relates that the various novel features may be incorporated in still other structural forms without departing from the spirit and scope of the invention as defined in the subjoined claims.

The principles of the invention having now been fully explained in connection with the foregoing description of the several illustrative embodiments, the invention is hereby claimed as follows:

1. In a milling machine adapted to perform climb cutting operations including rotary driving mechanism and a reciprocating table subject to climb cutting forces tending to cause the table to overrun the driving mechanism, a power driven member selectively connectible to rotate said driving mechanism at feed rate or at rapid traverse rate alternatively, a screw and nut translating mechanism operatively connected to be driven by said driving mechanism and arranged to reciprocate said table, a selectively engageable friction disc brake mounted on and disposed to act directly upon said screw and nut mechanism in manner to prevent overrunning of said table when it is being actuated by said driving mechanism at feed rate, and means operating automatically to disengage said brake when said driving mechanism is operating at rapid traverse rate.

2. In a machine tool having a frame, a source of power, a rotary power transmitting train connected to be driven by said power source selectively at feed rate or at rapid traverse rate, a screw and nut driving mechanism operatively connected to be driven by said power train, a supporting member movably mounted on said frame and operatively connected to be actuated by said screw and nut mechanism, said supporting member being subject to forces tending to cause it to overrun said power transmitting train, a friction disc brake mounted on and selectively engageable to act directly upon said screw and nut mechanism in manner to prevent overrunning of said supporting member when it is being actuated at feed rate, and means automatically operable to disengage said brake when said power transmitting train is operating at rapid traverse rate.

3. In a machine tool, the combination of a tool support, a movable work support, a transmission for moving said work support, said transmission including a feed rate train, a rapid traverse rate train, and a reverser, a control means movable in either of two planes, movement in one of said planes serving to select the direction of work support movement, movement in the other of said planes serving to select the rate of work support movement, a brake mechanism operative upon said transmission, a hydraulic system for energizing said brake mechanism, said system including a valve movable in response to movement of said control means in one plane and a second valve movable in response to movement of said control means in the other plane said valves being connected in series circuit relationship, the arrangement of said valves being such that they will both be open and said brake mechanism will be energized only when said transmission is engaged at feed rate of movement in either the one or the other direction.

4. In a milling machine, the combination of a tool support, a movable work support, a feed screw journalled in said work support, a nut cooperating with said feed screw, a drive for rotating said feed screw relative to said nut to move said work support, a feed rate transmission and a rapid traverse rate transmission in said drive, control means operative to engage either transmission selectively, a brake mechanism mounted on and adapted to be operative directly upon said feed screw to retard the rotation of said feed screw, and means responsive to movement of said control means whereby said brake mechanism is rendered operative when said feed rate transmission is engaged and inoperative when said rapid traverse rate transmission is engaged or when both of said transmissions are disengaged.

5. A machine tool comprising in combination a bed, a work supporting table movably mounted on said bed, a cooperating tool supporting element on said bed, a feed screw operatively connected with said table, a nut element having one portion thereof fixed in said bed and another portion adjustable with respect to said fixed portion to eliminate end play between said nut and said screw, a driving means for said screw, and a brake mechanism mounted on and operative upon said feed screw and against said nut to resist rotation of said screw.

6. In a machine tool, the combination of a tool support, a movable work support, a rotatable feed screw journalled in said work support, a nut element including a fixed portion and a movable portion, said movable portion being adjustable relative to said fixed portion whereby backlash between said feed screw and said nut may be reduced to a minimum, a driving means for rotating said feed screw, and a brake mechanism on said feed screw and operative against said nut to resist rotation of said screw under action of a tool in said tool support on a work piece carried by said work support.

7. In a milling machine, the combination of a tool support, a movable work support, a drive for said work support including a rotatable feed screw, a nut member including a fixed part and an adjustable part, said adjustable part being movable to provide means for eliminating end play between said screw and said nut, means for driving said feed screw, and a brake mechanism mounted on and operative directly upon said feed screw to effect a frictional resistance sufficient to preclude movement of said work support by any force other than that exerted by said feed screw driving means.

8. In a milling machine, the combination of a tool support, a cooperating movable work support, a rotatable feed screw operatively connected to actuate said movable work support, driving means for said feed screw, a friction disc brake mechanism mounted on said feed screw and operative to resist rotation thereof, and means for rendering said brake mechanism selectively operative or inoperative.

9. In a milling machine adapted for performing climb cutting operations, a frame, a cutting tool carried by said frame, a work support movably mounted on said frame, means for driving said work support including a screw and a cooperating nut, said screw and nut being mounted in such manner that said support is caused to move upon relative rotation between said screw and said nut, means operative to adjust said nut into snug engagement with said screw to obviate lost motion therebetween during climb cutting, and a selectively engageable friction disc brake mounted on said screw and arranged to operate between said nut and said screw and effective when engaged to prevent relative overrunning of said nut and screw as the result of external forces exerted upon said work support during climb cutting.

10. In a milling machine adapted to perform climb cutting operations, a work supporting element, a cutter carrying element, a non-irreversible screw and nut mechanism operatively connected to effect relative movement between said work supporting element and said cutter carrying element, power operated means selectively engageable to drive said screw and nut mechanism to effect said relative movement at feed rate in either direction, other power operated means selectively engageable to drive said screw and nut mechanism to effect said relative movement at rapid traverse rate in either direction, anti-backlash mechanism including a brake selectively engageable directly upon said screw and nut mechanism to prevent it from overrunning said power operated means, a control member operatively connected to control said feed rate driving means, a control member operatively connected to control said rapid traverse rate driving means, and interlocking control mechanism for said anti-backlash brake mechanism so interconnected with said feed rate control member that said anti-backlash brake is engaged whenever said feed rate driving means is engaged for feed rate movement in either direction and said anti-backlash brake is disengaged whenever said feed rate mechanism is disengaged and so interconnected with said rapid traverse rate control member that said anti-backlash brake is disengaged whenever said rapid traverse rate driving means is engaged for rapid traverse movement in either direction.

11. In a machine tool, the combination with a tool support, a work support, and driving mechanism operative to effect relative movement between said tool support and said work support, said mechanism including transmission means adapted to effect said relative movement selectively at feed rate or at rapid traverse rate and disconnecting reversing means adapted to effect said relative movement selectively in either direction, a controller for said transmission means arranged for movement in either of two planes, movement in one of said planes functioning to select the rate of said relative driving movement and movement in the other of said planes serving to select the direction of said relative driving movement, an anti-backlash mechanism selectively operative upon said driving mechanism to prevent overrunning thereof, and a control system operative to energize said anti-backlash mechanism said control system including a control element responsive to movement of said controller in said rate selecting plane and arranged to energize said anti-backlash mechanism only when said controller is in feed rate position and a control element responsive to movement of said controller in said direction selecting plane and arranged to energize said anti-backlash mechanism only when said controller is in the one or the other direction selecting position, the arrangement being such that said anti-backlash mechanism is inoperative when said controller is in disconnecting position to provide for effecting relative movement manually without resistance from said anti-backlash mechanism.

12. In a machine tool, a supporting frame, a working element movably mounted on said frame and subject to external forces, mechanism for effecting controlled movement of said working element relative to said frame including a feed screw and a cooperating nut, means to adjust said nut into close engagement with said screw in manner to prevent lost motion while permitting free relative rotation therebetween, and a brake splined on said feed screw and arranged to operate against said nut to resist relative rotation therebetween for preventing undesired movement of said working element by external forces.

13. In a machine tool, a supporting frame, a working element movably mounted on said frame and subject to external forces, mechanism for effecting controlled movement of said working element relative to said frame including a feed screw and a cooperating nut, means to adjust said nut into close engagement with said screw in manner to prevent lost motion while permitting free relative rotation therebetween, a brake splined on said feed screw and arranged to operate against said nut to resist relative rotation therebetween for preventing undesired movement of said working element by external forces, and a manually operable control linkage arranged to effect engagement or disengagement of said brake selectively.

14. In a machine tool, a supporting frame, a working element movably mounted on said frame and subject to external forces, mechanism for effecting controlled movement of said working element relative to said frame including a feed screw and a cooperating nut, means to adjust said nut into close engagement with said screw in manner to prevent lost motion while permitting free relative rotation therebetween, a brake including co-acting friction members on said feed screw arranged to operate against said nut to resist relative rotation therebetween for preventing undesired movement of said working element by external forces, and hydraulically actuated control mechanism selectively operative to engage or disengage said brake.

15. In a machine tool, a supporting frame, a working element movably mounted on said frame and subject to external forces, mechanism for effecting controlled movement of said working element relative to said frame including a feed screw and a cooperating nut, means to adjust said nut into close engagement with said screw in manner to prevent lost motion while permitting free relative rotation therebetween, a brake splined on said feed screw and arranged to operate against said nut to resist relative rotation therebetween for preventing undesired movement of said working element by external forces, a control system operatively arranged to select the rate and direction of movement of said working element, and means associated with said control system and operative to effect engagement or disengagement of said brake in predetermined relationship with the selection of the rate of movement of said working element.

16. In a machine tool, a supporting frame, a working element movably mounted on said frame and subject to external forces, mechanism for effecting controlled movement of said working element relative to said frame including a feed screw and a cooperating nut, means to adjust said nut into close engagement with said screw in manner to prevent lost motion while permitting free relative rotation therebetween, a brake on said feed screw arranged to operate against said nut to resist relative rotation therebetween for preventing undesired movement of said working element by external forces, a control system operatively arranged to select the rate and direction of movement of said working element, means associated with said control system and operative to effect engagement of said brake when said working element is moving at feed rate, said brake being disengaged when said element is moving at rapid traverse rate, and auxiliary control means selectively operable to effect engagement of said brake when said element is not moving, for the purpose of locking it in predetermined position.

17. In a machine tool, a supporting frame, a working element movably mounted on said frame and subject to external forces, mechanism for effecting controlled movement of said working element relative to said frame including a feed screw and a cooperating nut, means to adjust said nut into close engagement with said screw in manner to prevent lost motion while permitting free relative rotation therebetween, a brake splined on said feed screw and arranged to operate against said nut to resist relative rotation therebetween for preventing undesired movement of said working element by external forces, a control system including means to select the rate of movement of said working element and means to select the direction of movement of said working element, and a control device associated with each of said control means, said control devices being arranged to cooperate in effecting engagement or disengagement of said brake in accordance with the settings of said rate and direction controlling means.

18. In a machine tool, a supporting frame, a working element movably mounted on said frame and subject to external forces, mechanism for effecting controlled movement of said working element relative to said frame including a feed screw and a cooperating nut, means to adjust said nut into close engagement with said screw in manner to prevent lost motion while permitting free relative rotation therebetween, a brake on said feed screw arranged to operate against said nut to resist relative rotation therebetween for preventing undesired movement of said working element by external forces, a control system including a controller operative to select the rate of movement of said working element and a controller operative to select the direction of movement of said working element, a control device associated with said rate selecting controller and operative to disengage said brake when said controller is in position to effect movement at rapid traverse rate, and a control device associated with said direction selecting controller and operative to disengage said brake when said controller is in neutral position, whereby said working element may be operated at rapid traverse rate or actuated manually without interference from said brake.

19. In a milling machine, a frame, a work supporting table movably mounted on said frame, a table feeding screw rotatably mounted in said table, a nut fixed in said frame in cooperating relationship with said feeding screw, a driving sleeve rotatably mounted in said frame and operatively connected to turn said screw, and a brake associated with said nut in manner to react against it and operative upon said driving sleeve to retard rotation of said feed screw, whereby overrunning of said table under the influence of external forces may be prevented.

20. In a milling machine, a frame, a cutter driving spindle rotatably mounted in said frame, a work supporting table slidably mounted on said frame in cooperating relationship with said spindle, means to move said table relative to said frame said means including a nut and a cooperating relatively rotatable screw, a sleeve splined on said screw, and a brake carried by said nut and disposed to operate upon said sleeve, the arrangement being such that when a milling cutter on said spindle is effecting a climb cutting operation upon a work piece on said table said brake may be engaged to prevent said table from overrunning said table moving means.

21. In a milling machine, a frame, a work supporting table movably mounted on said frame, a feed screw rotatably mounted on said table, an adjustable feed nut mounted in said frame in cooperating relationship with said feed screw, the arrangement being such that said nut may be adjusted to obviate substantially all lost motion between said screw and said nut while permitting free rotation of said screw in said nut, a driving sleeve rotatably mounted in said frame and operatively connected to rotate said screw, and a brake associated with said nut in manner to react against it and arranged to act upon said driving sleeve to retard rotation of said screw relative to said nut for preventing overrunning of said table under the influence of external forces.

JOSEPH B. ARMITAGE.